United States Patent Office 3,444,371
Patented May 13, 1969

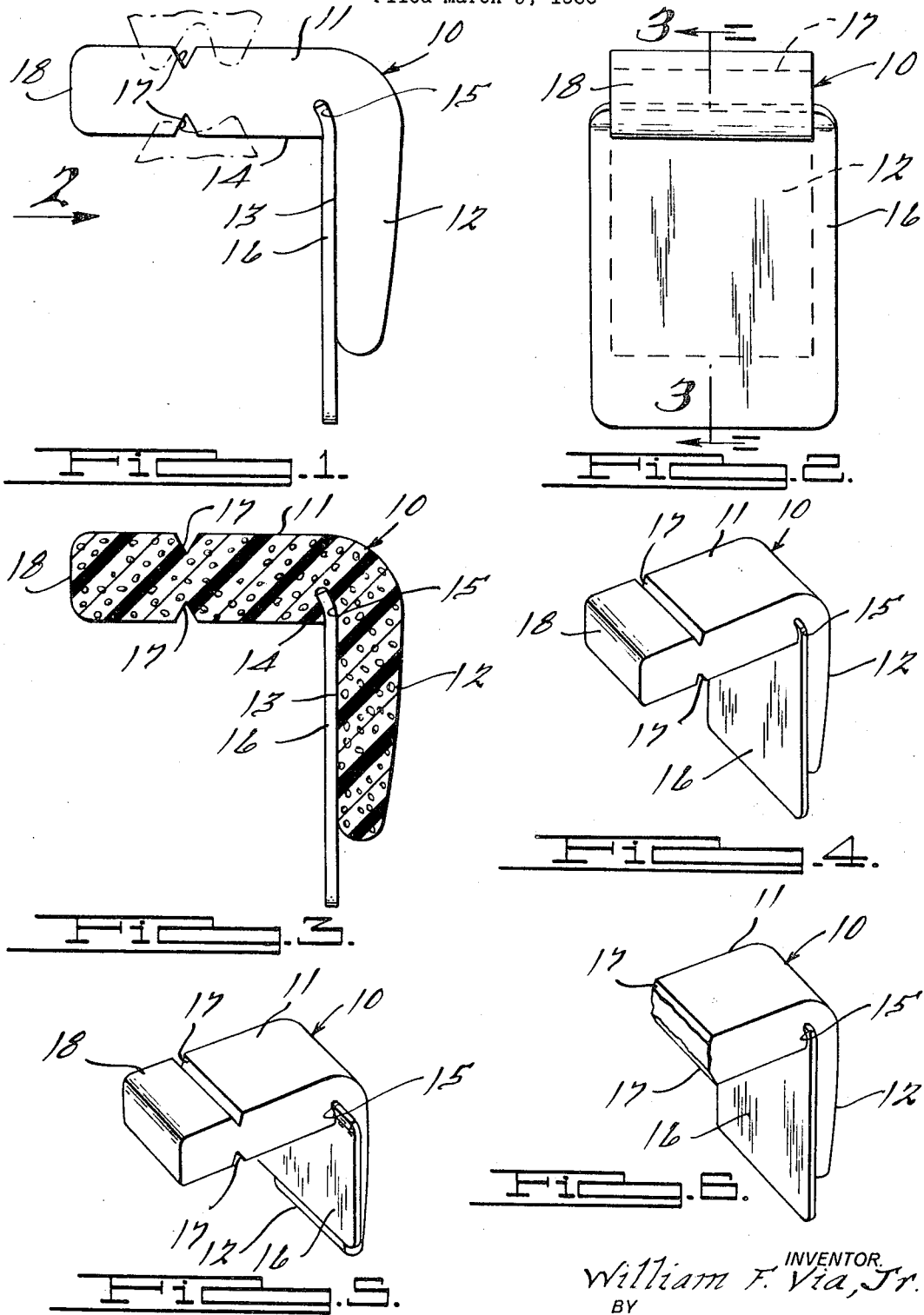

3,444,371
DISPOSABLE ONE-PIECE DENTAL X-RAY FILM HOLDER
William F. Via, Jr., 464 Chalfonte,
Grosse Pointe Farms, Mich. 48236
Continuation-in-part of application Ser. No. 519,706,
Jan. 10, 1966. This application Mar. 3, 1966, Ser.
No. 531,713
Int. Cl. G01n 23/04
U.S. Cl. 250—70                                    7 Claims

ABSTRACT OF THE DISCLOSURE

A disposable one-piece holder for a dental X-ray film is of L-shape, having a bite portion and a backup portion for the film disposed at right angles to each other. The holder is made from light soft material into which the teeth readily penetrate, providing a cheap unit which is disposable after use on a patient.

---

This invention relates to dental X-ray film holders and is a continuation-in-part of the invention embodied in the application Ser. No. 519,706, filed Jan. 10, 1966, now abandoned.

More recently, a substantial improvement has been made in dental radiography in which paralleling technique is employed. In the past the X-ray machines had a short cone from which the rays were emitted and the film was usually held against the teeth by the finger of the patient. The film and short cone were disposed in various angular relations to each other and to the teeth and as a result the picture of the teeth was often foreshortened or elongated. With the long cone technique, the film will be maintained substantially parallel to the teeth and the X-rays will be directed perpendicular to the teeth and the film and thereby provide a more accurate picture of the teeth condition.

The present invention pertains to a holder for the film which has a bite portion disposed at right angles to a backup wall portion. At the junction between the two portions, a slot is provided for receiving and holding the film and for urging and retaining it against the back wall portion. To accomplish this, the slot between the portions is sloped or curved forwardly into the bite portion thereby providing a pressure to urge the film against the back wall portion when one edge is disposed in the slot. In this position the film is perpendicular to the bite portion and when the bite portion is held between the teeth, the film will be parallel thereto and the long cone can be aimed along the bite piece to have the rays directed perpendicular to the teeth and the film. While the holder may be made from various materials, a light, soft, durable material was found to be advantageous. When the teeth penetrate into the bite portion, it cannot slip or move as would occur with a holder of hard material. The bite portion is of substantial length and when used on the molars or a small child, alined scores are provided on the top and bottom which permits the end to be readily broken off leaving a shorter bite portion. Accordingly, the main objects of the invention are: to provide a holder for dental X-ray film made of a light, soft, durable material which the teeth can support without slipping; to provide an X-ray film holder with a bite portion and a wall portion against which the film is urged when retained in a slot between the portions which is directed forwardly into the bite portion; to provide a holder for a dental X-ray film which is made from a light, inexpensive material so as to be disposable after being used on a patient; to provide alined score lines in the bite portion which permits a portion to be easily removed to shorten the bite portion; and in general, to provide a holder for an X-ray film which is simple in construction, which positively retains the film in position and which is economical of manufacture.

Other objects and features and novelty of the invention will be specifically pointed out or will become apparent when referring, for a better understanding of the invention, to the following description taken in conjunction with the accompanying drawing, wherein:

FIGURE 1 is a view of an X-ray film holder embodying features of the present invention:

FIG. 2 is a view of the structure illustrated in FIG. 1, as viewed from the point 2 thereof;

FIG. 3 is a sectional view of the structure illustrated in FIG. 2, taken on the line 3–3 thereof;

FIG. 4 is a perspective view of the holder illustrated in FIG. 1 with a rectangular film supported therein located perpendicular to the bite position;

FIG. 5 is a view of the structure of FIG. 4 with the short length of the film supported perpendicular to the bite position; and FIG. 6 is a view of the structure of FIG. 4 with the end of the bite portion removed.

The holder 10 has a bite portion 11 of rectangular shape and an upstanding wall portion 12 which is also of rectangular shape. The wall portion has an inner face 13 which is perpendicular to the adjacent face 14 of the bite portion. Between the faces 13 and 14 a slot 15 is provided, which slopes or curves to the left, as illustrated in FIG. 1, away from the wall portion 12. The film package 16 when moved downwardly into the slot 15, will be urged rearwardly against the face 13 to thereby be perpendicular to the face 14 of the bite portion 11. When the teeth, illustrated in broken lines in FIG. 1, bite into the material of the bite portion 11, the film 16 will be substantially parallel to the length of the teeth.

The holder is preferably made from a light, soft, durable material in which the teeth can penetrate without breaking or crumbling the material. The material is preferably a nontoxic foamed plastic such as polystyrene, polyurethane, a vinyl or phenolic foam and the like. The polystyrene foam known by the trade name Dylite procurable from the Sinclair-Koppers Company, has proven to be very satisfactory. This is an expandable polystyrene in the form of beads of high density which are moldable to a low density foam material by the application of heat. The beads are placed in a mold having a cavity the shape of the holder and upon the application of heat of approximately 230° to 275° F. the beads will expand to fill the mold cavity and provide a durable skin on the outer surface of the holder. The material, while compressible, is extremely durable and will not crack or break into pieces when bitten into by the teeth. The holder can be employed for a series of X-ray photographs of the teeth of a patient and is expendable so that it may be thrown away thereafter. The particular Dylite material is radiolucent and will not produce shaded areas on the film. The paralleling technique in which the specific holder plays a part produces X-ray pictures of the teeth and the condition thereof without the foreshortening or elongation thereof and without shadows being produced by the material.

Alined scores or recesses 17 extend into the bite portion parallel to the wall portion 12 to permit the end portion 18 of the bite portion to be removed when a short bite portion is desired.

With the film disposed perpendicular to the bite portion it will be substantially parallel to the teeth which bite into the bite portion. The surface of the bite portion being perpendicular to the film is employed for aiming the long cone so that the X-rays will be delivered perpendicular to the teeth and the film to produce an accurate picture of the teeth on the film without shaded areas from the material of the holder.

What is claimed is:

1. A disposable one-piece holder for a dental X-ray film having a bite portion and a wall portion which are rigid and made of the same material and disposed at ninety degrees to each other, the junction between the portions having a slot which extends downwardly and forwardly into the bite portion for securely holding the film and urging it against the face of the wall portion at ninety degrees to the bite portion.

2. A holder as recited in claim 1 wherein the bite and wall portions are made of a light, soft, durable material.

3. In a holder as recited in claim 2 wherein the material of the holder is a foamed plastic.

4. A holder as recited in claim 2 wherein the material is X-ray transparent.

5. The holder as recited in claim 1 wherein the bite and wall portions are made from a polystyrene foamed material.

6. A holder as recited in claim 1 where the bite portion has at least one score line therein for permitting the end to be broken off to shorten the bite portion.

7. A holder as recited in claim 6 wherein a score is provided on both faces of the bite portion in alined relation and parallel to the wall portion.

References Cited

UNITED STATES PATENTS

| | | | |
|---|---|---|---|
| 1,548,171 | 8/1925 | Raper | 250—70 |
| 3,304,422 | 2/1967 | Medwedeff | 250—70 |

WILLIAM F. LINDQUIST, *Primary Examiner.*